(12) United States Patent
Obitsu (10) Patent No.: US 6,975,844 B2
(45) Date of Patent: Dec. 13, 2005

(54) TUNER RECEIVING SYSTEM, CONTROL UNIT FOR RECEIVING RADIO WAVES BY USING TUNER, STORAGE MEDIUM FROM WHICH DATA CAN BE READ OUT BY USING COMPUTER, AND METHOD OF RECEIVING RADIO WAVES BY USING TUNER

(75) Inventor: Toshiro Obitsu, Inagi (JP)

(73) Assignee: Fujitsu Limited, Kawasaki (JP)

( * ) Notice: Subject to any disclaimer, the term of this patent is extended or adjusted under 35 U.S.C. 154(b) by 360 days.

(21) Appl. No.: 09/734,705

(22) Filed: Dec. 13, 2000

(65) Prior Publication Data

US 2001/0019948 A1 Sep. 6, 2001

(30) Foreign Application Priority Data

Feb. 15, 2000 (JP) ........................................ 2000-036613

(51) Int. Cl.⁷ ................................................ H04B 1/18
(52) U.S. Cl. ................................ 455/193.1; 455/150.1; 455/160.1; 455/566
(58) Field of Search ............................... 455/193.1, 596, 455/87, 150.1, 154.1, 154.2, 160.1, 197.3, 178.1, 187.1, 188.1, 191.1, 340

(56) References Cited

U.S. PATENT DOCUMENTS 6,243,141 B1 * 6/2001 Nio et al. .................... 348/554

FOREIGN PATENT DOCUMENTS

| JP | 6-46427 | 2/1994 |
| JP | 10-39970 | 2/1998 |
| JP | 10-39971 | 2/1998 |

* cited by examiner

Primary Examiner—CongVan Tran
(74) Attorney, Agent, or Firm—Staas & Halsey LLP

(57) ABSTRACT

A tuner receiving system, a control unit for controlling a tuner receiving operation, a computer readable storage medium, and a method of receiving radio waves by using a tuner, are disclosed. The tuner receiving system outputs video and audio signals by processing the signals sent out when communication is established between a tuner unit for receiving radio waves from external sources and a capture card or the like. The main part of the system or the control unit discriminates the type of the tuner included in the tuner unit, based on a control signal output from the tuner unit after the start of the communication between the tuner unit and the communication interface unit, and displays a receiving station corresponding to a channel receivable by the tuner, in accordance with the type of the tuner and information from the communication interface unit.

6 Claims, 7 Drawing Sheets

TUNER RECEIVING SYSTEM, CONTROL UNIT FOR RECEIVING RADIO WAVES BY USING TUNER, STORAGE MEDIUM FROM WHICH DATA CAN BE READ OUT BY USING COMPUTER, AND METHOD OF RECEIVING RADIO WAVES BY USING TUNER

BACKGROUND OF THE INVENTION

1. Field of the Invention

The present invention relates to a tuner receiving system, a control unit for receiving radio waves by using a tuner, a storage medium which can be read by using a computer, and a method of receiving radio waves by using a tuner, in which a signal sent out from a communication interface unit is processed and data such as images and sounds are output in the case in which a communication is established between a tuner unit, such as a tuner box, for receiving radio waves, such as color television broadcasting waves, sent from an external source and a communication interface unit, such as a capture card, connected to the tuner unit.

In recent years, various tuner receiving systems have been almost established for personal computers, in which an arbitrary signal sent from an external television system (usually called a TV system) is received by a tuner, and video data and audio data can be output. Some of such tuner receiving systems operate in such a manner that video and audio signals from external sources are input by connecting a detachable capture card to the main part of a personal computer. A tuner exclusively for each of the above tuner receiving systems is available, which can be connected to the capture card, via a video signal input terminal and an audio signal input terminal that are disposed in the tuner for connecting the tuner to the capture card. A tuner box having this tuner built therein is controlled by the above capture card. It should be noted that the specifications of the tuner built in the tuner box are usually fixed. However, a video/audio input system using the capture card is required to meet various needs, and also the tuner is required to meet various requirements including the specifications corresponding to overseas broadcast, in spite of the above fact.

2. Description of the Related Art

The exclusive tuner connected to the capture card included in a conventional tuner receiving system is controlled by the use of a control signal (such as a serial control signal) sent from the capture card connected to the tuner, and operations of the tuner are also controlled by this control signal.

For reference, lists of receiving frequencies for Japanese channels, U.S. channels, the U.S. channels for CATV (cable television), European channels, European channels for CATV and Chinese channels are shown in Tables 1 to 6 mentioned below.

TABLE 1

List of Receiving Frequencies in Japanese Channels

| CH No. | Central Freq. | Freq. Range | Video Freq. fp | Audio Freq. fs | Local Oscillation fosc | Image Freq. | CH No. | Central Freq. | Freq. Range | Video Freq. fp | Audio Freq. fs | Local Oscillation fosc | Image Freq. |
|---|---|---|---|---|---|---|---|---|---|---|---|---|---|
| 1 | 93 | 90–96 | 91.25 | 95.75 | 150 | 208.75 | 32 | 587 | 584–590 | 585.25 | 589.75 | 644 | 702.75 |
| 2 | 99 | 96–102 | 97.25 | 101.75 | 156 | 214.75 | 33 | 593 | 590–596 | 591.25 | 595.75 | 650 | 708.75 |
| 3 | 105 | 102–108 | 103.25 | 107.75 | 162 | 220.75 | 34 | 599 | 596–602 | 597.25 | 601.75 | 656 | 714.75 |
| 4 | 173 | 170–176 | 171.25 | 175.75 | 230 | 288.75 | 35 | 605 | 602–608 | 603.25 | 607.75 | 662 | 720.75 |
| 5 | 179 | 176–182 | 177.25 | 181.75 | 236 | 294.75 | 36 | 611 | 608–614 | 609.25 | 613.75 | 668 | 726.75 |
| 6 | 185 | 182–188 | 183.25 | 187.75 | 242 | 300.75 | 37 | 627 | 614–620 | 615.25 | 619.75 | 674 | 732.75 |
| 7 | 191 | 188–194 | 189.25 | 193.75 | 248 | 306.75 | 38 | 623 | 620–626 | 621.25 | 625.75 | 680 | 738.75 |
| 8 | 195 | 192–198 | 193.25 | 197.75 | 252 | 310.75 | 39 | 629 | 626–632 | 627.25 | 631.75 | 686 | 744.75 |
| 24 | 539 | 536–542 | 537.25 | 541.75 | 596 | 654.75 | 55 | 725 | 722–728 | 723.25 | 727.75 | 782 | 840.75 |
| 25 | 545 | 542–548 | 543.25 | 547.75 | 602 | 660.75 | 56 | 731 | 728–734 | 729.25 | 733.75 | 788 | 846.75 |
| 26 | 551 | 548–554 | 549.25 | 553.75 | 608 | 666.75 | 57 | 737 | 734–740 | 735.25 | 739.75 | 794 | 852.75 |
| 27 | 557 | 554–560 | 555.25 | 559.75 | 614 | 672.75 | 58 | 743 | 740–746 | 741.25 | 745.75 | 880 | 858.75 |
| 28 | 563 | 560–566 | 561.25 | 565.75 | 620 | 678.75 | 59 | 749 | 746–752 | 747.25 | 751.75 | 806 | 864.75 |
| 29 | 569 | 566–572 | 567.25 | 571.75 | 626 | 684.75 | 60 | 755 | 752–758 | 753.25 | 757.75 | 812 | 870.75 |
| 30 | 575 | 572–578 | 573.25 | 577.75 | 632 | 690.75 | 61 | 761 | 758–764 | 759.25 | 763.75 | 818 | 876.75 |
| 31 | 581 | 578–584 | 579.25 | 583.75 | 638 | 696.75 | 62 | 767 | 764–770 | 765.25 | 769.75 | 824 | 882.75 |

Unit: MHz
Audio IF: 54.25 MHz
Video IF: 58.75 MHz

TABLE 2

List of Receiving Frequencies in U.S. Channels

| CH No. | Central Freq. | Freq. Range | Video Freq. fp | Audio Freq. fs | Local Oscillation fosc | Image Freq. | CH No. | Central Freq. | Freq. Range | Video Freq. fp | Audio Freq. fs | Local Oscillation fosc | Image Freq. |
|---|---|---|---|---|---|---|---|---|---|---|---|---|---|
| 2 | 57 | 54–60 | 55.25 | 59.75 | 101 | 146.75 | 43 | 647 | 644–650 | 645.25 | 649.75 | 691 | 736.75 |
| 3 | 63 | 60–66 | 61.25 | 65.75 | 107 | 152.75 | 44 | 653 | 650–656 | 651.25 | 655.75 | 697 | 742.75 |
| 4 | 69 | 66–72 | 67.25 | 71.75 | 113 | 158.75 | 45 | 659 | 656–662 | 657.25 | 661.75 | 703 | 748.75 |
| 5 | 79 | 76–82 | 77.25 | 81.75 | 123 | 168.75 | 46 | 665 | 662–668 | 663.25 | 667.75 | 709 | 754.75 |
| 6 | 85 | 82–88 | 83.25 | 87.75 | 129 | 174.75 | 47 | 671 | 668–674 | 669.25 | 673.75 | 715 | 760.75 |

TABLE 2-continued

List of Receiving Frequencies in U.S. Channels

| CH No. | Central Freq. | Freq. Range | Video Freq. fp | Audio Freq. fs | Local Oscillation fosc | Image Freq. | CH No. | Central Freq. | Freq. Range | Video Freq. fp | Audio Freq. fs | Local Oscillation fosc | Image Freq. |
|---|---|---|---|---|---|---|---|---|---|---|---|---|---|
| 7 | 177 | 174–180 | 175.25 | 179.75 | 221 | 266.75 | 48 | 677 | 674–680 | 675.25 | 679.75 | 721 | 766.75 |
| 8 | 183 | 180–186 | 181.25 | 185.75 | 227 | 272.75 | 49 | 683 | 680–686 | 681.25 | 685.75 | 727 | 772.75 |
| 9 | 189 | 186–192 | 187.25 | 191.75 | 233 | 278.75 | 50 | 689 | 686–692 | 687.25 | 691.75 | 733 | 778.75 |
| 35 | 599 | 596–602 | 597.25 | 601.75 | 643 | 688.75 | 76 | 845 | 842–848 | 843.25 | 847.75 | 889 | 934.75 |
| 36 | 605 | 602–608 | 603.25 | 607.75 | 649 | 694.75 | 77 | 851 | 848–854 | 849.25 | 853.75 | 895 | 940.75 |
| 37 | 611 | 608–614 | 609.25 | 613.75 | 655 | 700.75 | 78 | 857 | 854–860 | 855.25 | 859.75 | 901 | 946.75 |
| 38 | 617 | 614–620 | 615.25 | 619.75 | 661 | 706.75 | 79 | 863 | 860–866 | 861.25 | 865.75 | 907 | 952.75 |
| 39 | 623 | 620–626 | 621.25 | 625.75 | 667 | 712.75 | 80 | 869 | 866–872 | 867.25 | 871.75 | 913 | 958.75 |
| 40 | 629 | 626–632 | 627.25 | 631.75 | 673 | 718.75 | 81 | 875 | 872–878 | 873.25 | 877.75 | 919 | 964.75 |
| 41 | 635 | 632–638 | 633.25 | 637.75 | 679 | 724.75 | 82 | 881 | 878–884 | 879.25 | 883.75 | 925 | 970.75 |
| 42 | 641 | 638–644 | 639.25 | 643.75 | 685 | 730.75 | 83 | 887 | 884–890 | 885.25 | 889.75 | 931 | 976.75 |

Unit: MHZ
Audio IF: 41.25 MHz
Video IF: 45.75 MHz

TABLE 3

List of Receiving Frequencies in U.S. Channels for CATV

| CH No. | Central Freq. | Freq. Range | Video Freq. fp | Audio Freq. fs | Local Oscillation fosc | Image Freq. | CH No. | Central Freq. | Freq. Range | Video Freq. fp | Audio Freq. fs | Local Oscillation fosc | Image Freq. |
|---|---|---|---|---|---|---|---|---|---|---|---|---|---|
| 2 | 57 | 54–60 | 55.25 | 59.75 | 101 | 146.75 | R | 267 | 264–270 | 265.25 | 269.75 | 311 | 356.75 |
| 3 | 63 | 60–66 | 61.25 | 65.75 | 107 | 152.75 | S | 273 | 270–276 | 271.25 | 275.75 | 317 | 362.75 |
| 4 | 69 | 66–72 | 67.25 | 71.75 | 113 | 158.75 | T | 279 | 276–282 | 277.25 | 281.75 | 323 | 368.75 |
| 5 | 79 | 76–82 | 77.25 | 81.75 | 123 | 168.75 | U | 285 | 282–288 | 283.25 | 287.75 | 329 | 374.75 |
| 6 | 85 | 82–88 | 83.25 | 87.75 | 129 | 174.75 | V | 291 | 288–294 | 289.25 | 293.75 | 335 | 380.75 |
| A-6 | 87 | 84–90 | 85.25 | 89.75 | 131 | 176.75 | W | 297 | 294–300 | 295.25 | 299.75 | 341 | 386.75 |
| A-5 | 93 | 90–96 | 91.25 | 95.75 | 137 | 182.75 | W + 1 | 303 | 300–306 | 301.25 | 305.75 | 347 | 392.75 |
| A-4 | 99 | 96–102 | 97.25 | 101.75 | 143 | 188.75 | W + 2 | 309 | 306–312 | 307.25 | 311.75 | 353 | 398.75 |
| J | 219 | 216–222 | 217.25 | 221.75 | 263 | 308.75 | W + 22 | 429 | 426–432 | 427.25 | 431.75 | 473 | 518.75 |
| K | 225 | 222–228 | 223.25 | 227.75 | 269 | 314.75 | W + 23 | 435 | 432–438 | 433.25 | 437.75 | 479 | 524.75 |
| L | 231 | 228–234 | 229.25 | 233.75 | 275 | 320.75 | W + 24 | 441 | 438–444 | 439.25 | 443.75 | 485 | 530.75 |
| M | 237 | 234–240 | 235.25 | 239.75 | 281 | 326.75 | W + 25 | 447 | 444–450 | 445.25 | 449.75 | 491 | 536.75 |
| N | 243 | 240–246 | 241.25 | 245.75 | 287 | 332.75 | W + 26 | 453 | 450–456 | 451.25 | 455.75 | 497 | 542.75 |
| O | 249 | 246–252 | 247.25 | 251.75 | 293 | 338.75 | W + 27 | 459 | 456–462 | 457.25 | 461.75 | 503 | 548.75 |
| P | 255 | 252–258 | 253.25 | 257.75 | 299 | 344.75 | W + 28 | 465 | 462–468 | 463.25 | 467.75 | 509 | 554.75 |
| Q | 261 | 258–264 | 259.25 | 263.75 | 305 | 350.75 | W + 29 | 471 | 468–474 | 469.25 | 473.75 | 515 | 560.75 |

Unit: MHz
Audio IF: 41.25 MHz
Video IF: 45.75 MHz

TABLE 4

List of Receiving Frequencies in European (German) Channels

| CH No. | Central Freq. | Freq. Range | Video Freq. fp | Audio Freq. fs | Local Oscillation fosc | Image Freq. | CH No. | Central Freq. | Freq. Range | Video Freq. fp | Audio Freq. fs | Local Oscillation fosc | Image Freq. |
|---|---|---|---|---|---|---|---|---|---|---|---|---|---|
| 2 | 50.5 | 47–54 | 48.25 | 53.75 | 87.15 | 126.05 | 40 | 626 | 622–630 | 623.25 | 628.75 | 662.15 | 701.05 |
| 3 | 57.5 | 54–61 | 55.25 | 60.75 | 94.15 | 133.05 | 41 | 634 | 630–638 | 631.25 | 636.75 | 670.15 | 709.05 |
| 4 | 64.5 | 61–68 | 62.25 | 67.75 | 101.15 | 140.05 | 42 | 642 | 638–646 | 639.25 | 644.75 | 678.15 | 717.05 |
| 5 | 177.5 | 174–181 | 175.25 | 180.75 | 214.15 | 253.05 | 43 | 650 | 646–654 | 647.25 | 652.75 | 686.15 | 725.05 |
| 6 | 184.5 | 181–188 | 182.25 | 187.75 | 221.15 | 260.05 | 44 | 658 | 654–662 | 655.25 | 660.75 | 694.15 | 733.05 |
| 7 | 191.5 | 188–195 | 189.25 | 194.75 | 228.15 | 267.05 | 45 | 666 | 662–670 | 663.25 | 668.75 | 702.15 | 741.05 |
| 8 | 198.5 | 195–202 | 196.25 | 201.75 | 235.15 | 274.05 | 46 | 674 | 670–678 | 671.25 | 676.75 | 710.15 | 749.05 |
| 9 | 205.5 | 202–209 | 203.25 | 208.75 | 242.15 | 281.05 | 47 | 682 | 678–686 | 679.25 | 684.75 | 718.15 | 757.05 |
| 32 | 562 | 558–566 | 559.25 | 564.75 | 598.15 | 637.05 | 62 | 802 | 798–806 | 799.25 | 804.75 | 838.15 | 877.05 |
| 33 | 570 | 566–574 | 567.25 | 572.75 | 606.15 | 645.05 | 63 | 810 | 806–814 | 807.25 | 812.75 | 846.15 | 885.05 |
| 34 | 578 | 574–582 | 575.25 | 580.75 | 614.15 | 653.05 | 64 | 818 | 814–822 | 815.25 | 820.75 | 854.15 | 893.05 |
| 35 | 586 | 582–590 | 583.25 | 588.75 | 622.15 | 661.05 | 65 | 826 | 822–830 | 823.25 | 828.75 | 862.15 | 901.05 |
| 36 | 594 | 590–598 | 591.25 | 596.75 | 630.15 | 669.05 | 66 | 834 | 830–838 | 831.25 | 836.75 | 870.15 | 909.05 |
| 37 | 602 | 598–606 | 599.25 | 604.75 | 638.15 | 677.05 | 67 | 842 | 838–846 | 839.25 | 844.75 | 878.15 | 917.05 |

TABLE 4-continued

List of Receiving Frequencies in European (German) Channels

| CH No. | Central Freq. | Freq. Range | Video Freq. fp | Audio Freq. fs | Local Oscillation fosc | Image Freq. | CH No. | Central Freq. | Freq. Range | Video Freq. fp | Audio Freq. fs | Local Oscillation fosc | Image Freq. |
|---|---|---|---|---|---|---|---|---|---|---|---|---|---|
| 38 | 610 | 606–614 | 607.25 | 612.75 | 646.15 | 685.05 | 68 | 850 | 846–854 | 847.25 | 852.75 | 886.15 | 925.05 |
| 39 | 618 | 614–622 | 615.25 | 620.75 | 654.15 | 693.05 | 69 | 858 | 854–862 | 855.25 | 860.75 | 894.15 | 933.05 |

Unit: MHz
Audio IF: 33.4 MHz
Video IF: 38.9 MHz

TABLE 5

List of Receiving Frequencies in European (German) Channels for CATV

| CH No. | Central Freq. | Freq. Range | Video Freq. fp | Audio Freq. fs | Local Oscillation fosc | Image Freq. | CH No. | Central Freq. | Freq. Range | Video Freq. fp | Audio Freq. fs | Local Oscillation fosc | Image Freq. |
|---|---|---|---|---|---|---|---|---|---|---|---|---|---|
| E2 | 50.5 | 47–54 | 48.25 | 53.75 | 87.15 | 126.05 | S15 | 261.5 | 258–265 | 259.25 | 264.75 | 298.15 | 337.05 |
| E3 | 57.5 | 54–61 | 55.25 | 60.75 | 94.15 | 133.05 | S16 | 268.5 | 265–272 | 266.25 | 271.75 | 305.15 | 344.05 |
| E4 | 64.5 | 61–68 | 62.25 | 67.75 | 101.15 | 140.05 | S17 | 275.5 | 272–279 | 273.25 | 278.75 | 312.15 | 351.05 |
| X | 71.5 | 68–75 | 69.25 | 74.75 | 108.15 | 147.05 | S18 | 282.5 | 279–286 | 280.25 | 285.75 | 319.15 | 358.05 |
| Y | 78.5 | 75–82 | 76.25 | 81.75 | 115.15 | 154.05 | S19 | 289.5 | 286–293 | 287.25 | 292.75 | 326.15 | 365.05 |
| Z | 85.5 | 82–89 | 83.25 | 88.75 | 122.15 | 161.05 | S20 | 296.5 | 293–300 | 294.25 | 299.75 | 333.15 | 372.05 |
| S1 | 107.5 | 104–111 | 105.25 | 110.75 | 144.15 | 183.05 | S21 | 306 | 302–310 | 303.25 | 308.75 | 342.15 | 381.05 |
| S2 | 114.5 | 111–118 | 112.25 | 117.75 | 151.15 | 190.05 | S22 | 314 | 310–318 | 311.25 | 316.75 | 350.15 | 389.05 |
| E9 | 205.5 | 202–209 | 203.25 | 208.75 | 242.15 | 281.05 | S35 | 418 | 414–422 | 415.25 | 420.75 | 454.15 | 493.05 |
| E10 | 212.5 | 209–216 | 210.25 | 215.75 | 249.15 | 288.05 | S36 | 426 | 422–430 | 423.25 | 428.75 | 462.15 | 501.05 |
| E11 | 219.5 | 216–223 | 217.25 | 222.75 | 256.15 | 295.05 | S37 | 434 | 430–438 | 431.25 | 436.75 | 470.15 | 509.05 |
| E12 | 226.5 | 223–230 | 224.25 | 229.75 | 263.15 | 302.05 | S38 | 442 | 438–446 | 439.25 | 444.75 | 478.15 | 517.05 |
| S11 | 233.5 | 230–237 | 231.25 | 236.75 | 270.15 | 309.05 | S39 | 450 | 446–454 | 447.25 | 452.75 | 486.15 | 525.05 |
| S12 | 240.5 | 237–244 | 238.25 | 243.75 | 277.15 | 316.05 | S40 | 458 | 454–462 | 455.25 | 460.75 | 494.15 | 533.05 |
| S13 | 247.5 | 244–251 | 245.25 | 250.75 | 284.15 | 323.05 | S41 | 466 | 462–470 | 463.25 | 468.75 | 502.15 | 541.05 |
| S14 | 254.5 | 251–258 | 252.25 | 257.75 | 291.15 | 330.05 | | | | | | | |

Unit: MHz
Audio IF: 33.4 MHz
Video IF: 38.9 MHz

TABLE 6

List of Receiving Frequencies in Chinese Channels

| CH No. | Central Freq. | Freq. Range | Video Freq. fp | Audio Freq. fs | Local Oscillation fosc | Image Freq. | CH No. | Central Freq. | Freq. Range | Video Freq. fp | Audio Freq. fs | Local Oscillation fosc | Image Freq. |
|---|---|---|---|---|---|---|---|---|---|---|---|---|---|
| 1 | 52.5 | 48.5–56.5 | 49.75 | 56.25 | 87.75 | 125.75 | 30 | 650 | 646–654 | 647.25 | 653.75 | 685.25 | 723.25 |
| 2 | 60.5 | 56.5–64.5 | 57.75 | 64.25 | 95.75 | 133.75 | 31 | 658 | 654–662 | 655.25 | 661.75 | 693.25 | 731.25 |
| 3 | 68.5 | 64.5–72.5 | 65.75 | 72.25 | 103.75 | 141.75 | 32 | 666 | 662–670 | 663.25 | 669.75 | 701.25 | 739.25 |
| 4 | 80 | 76–84 | 77.25 | 83.75 | 115.25 | 153.25 | 33 | 674 | 670–678 | 671.25 | 677.75 | 709.25 | 747.25 |
| 5 | 88 | 84–92 | 85.25 | 91.75 | 123.25 | 161.25 | 34 | 682 | 678–686 | 679.25 | 685.75 | 717.25 | 755.25 |
| 6 | 171 | 167–175 | 168.75 | 174.75 | 206.25 | 244.25 | 35 | 690 | 686–694 | 687.25 | 693.75 | 725.25 | 763.25 |
| 7 | 179 | 175–183 | 176.25 | 182.75 | 214.25 | 252.25 | 36 | 698 | 694–702 | 695.25 | 701.75 | 733.25 | 771.25 |
| 8 | 187 | 183–191 | 184.25 | 190.75 | 222.25 | 260.25 | 37 | 706 | 702–710 | 703.25 | 709.75 | 741.25 | 779.25 |
| 22 | 546 | 542–550 | 543.25 | 549.75 | 581.25 | 619.25 | 51 | 818 | 814–822 | 815.25 | 821.75 | 853.25 | 891.25 |
| 23 | 554 | 550–558 | 551.25 | 557.75 | 589.25 | 627.25 | 52 | 826 | 822–830 | 823.25 | 829.75 | 861.25 | 899.25 |
| 24 | 562 | 558–566 | 559.25 | 565.75 | 597.25 | 635.25 | 53 | 834 | 830–838 | 831.25 | 837.75 | 869.25 | 907.25 |
| 25 | 610 | 606–614 | 607.25 | 613.75 | 645.25 | 683.25 | 54 | 842 | 838–846 | 839.25 | 845.75 | 877.25 | 915.25 |
| 26 | 618 | 614–622 | 615.25 | 621.75 | 653.25 | 671.25 | 55 | 850 | 846–854 | 847.25 | 853.75 | 885.25 | 923.25 |
| 27 | 626 | 622–630 | 623.25 | 629.75 | 661.25 | 699.25 | 56 | 858 | 854–862 | 855.25 | 861.75 | 893.25 | 931.25 |
| 28 | 634 | 630–638 | 631.25 | 637.75 | 669.25 | 707.25 | 57 | 866 | 862–870 | 863.25 | 869.75 | 901.25 | 939.25 |
| 29 | 642 | 638–646 | 639.25 | 645.75 | 677.25 | 715.25 | | | | | | | |

Unit: MHz
Audio IF: 31.5 MHz
Video IF: 38.0 MHz

Tables 1 to 6 describe the receiving frequencies including the central frequency, the frequency range of each channel number, the video frequency fp, the audio frequency fs, the local oscillation frequency fosc, the image frequency and the like, which are capable of normally receiving various radio waves of various channel numbers broadcast in Japan and abroad. Further, the list contains the audio intermediate frequency (audio IF) and the video intermediate frequency (video IF) after frequency conversion by using the tuner for every country. In these tables, however, the receiving frequencies for a part of the channel numbers are omitted. For the Japanese channels shown in Table 1, for example, the receiving frequencies of the channel Nos. 9 to 23 (CH9 to CH23) and Nos. 40 to 54 (CH40 to CH54) are not mentioned.

Furthermore, lists of color TV systems for every country in the principal parts of Asia, the principal parts of North and South Americas and the principal parts of Europe are shown in Tables 7 to 9, and a detailed list of color TV broadcast systems described in Tables 7 to 9 is shown in Table 10.

TABLE 7

List of Color TV Systems for Every Country in the Principal Parts of Asia

| Country | System | | | |
|---|---|---|---|---|
| | VHF | UHF | Color | Channel |
| Asia | | | | |
| Afghanistan | B | | PAL | C.C.I.R. |
| United Arab Emirates | B | | PAL | C.C.I.R. |
| Yemen Arab Republic | B | | PAL | C.C.I.R. |
| Israel | B | G | PAL | C.C.I.R. |
| Iraq | B | | SECAM | C.C.I.R. |
| Islamic Republic of Iran | B | | SECAM | C.C.I.R. |
| India | B | | PAL | C.C.I.R. |
| Indonesia | B | G | PAL | IN |
| Oman | B | G | PAL | C.C.I.R. |
| Qatar | B | | PAL | C.C.I.R. |
| Republic of Korea | M | M | NTSC | US |
| Democratic Cambodia | M | | NTSC | US |
| Democratic People's Republic of Korea | D | | SECAM | OIRT |
| Cyprus | B | H | PAL | C.C.I.R. |
| | B | G | | |
| Kuwait | B | | PAL | C.C.I.R. |
| Saudi Arabia | B | G | SECAM | C.C.I.R. |
| Syrian Arab Republic | B | | SECAM | C.C.I.R. |
| Singapore | B | | PAL | C.C.I.R. |
| Sri Lanka | B | | PAL | C.C.I.R. |
| Thailand | B | | PAL | C.C.I.R. |
| China | D | D | PAL | CHINA |
| Turkey | B | | (PAL) | C.C.I.R. |
| Nepal | — | — | — | — |
| Pakistan | B | | PAL | C.C.I.R. |
| Bahrain | B | | PAL | C.C.I.R. |
| Bangladesh | B | | PAL | C.C.I.R. |
| Burma | M | | NTSC | US* |
| Philippines | M | M | NTSC | US |
| Bhutan | — | — | — | — |
| Viet-Nam | D | | | |
| | M | | | |
| Malaysia | B | | PAL | C.C.I.R. |
| Brunei | B | | PAL | C.C.I.R. |
| Hong Kong | | I | PAL | UK |
| Macao | — | — | — | — |
| Taiwan | M | | NTSC | US |
| Japan | M | M | NTSC | JAPAN |

*Presumed Channels

TABLE 8

List of Color TV Systems for Every Country in the Principal Parts of North and South America

| Country | System | | | |
|---|---|---|---|---|
| | VHF | UHF | Color | Channel |
| North and South America | | | | |
| United States of America | M | M | NTSC | US |
| Argentina | N | | PAL | US |
| Uruguay | N | | PAL | US* |
| Equador | M | | NTSC | US |
| El Salvador | M | | NTSC | US* |
| Guyana | $K_1$ | | NTSC | F.O.T. |
| Canada | M | M | NTSC | US |
| Cuba | M | | NTSC | US* |
| Guatemala | M | | NTSC | US |
| Grenada | — | — | — | — |
| Costa Rica | M | | NTSC | US |
| Colombia | M | | NTSC | US* |
| Jamaica | M | | NTSC | US |
| Surinam | M | | NTSC | US |
| St. Vincent | — | — | — | — |
| Saint Lucia | M | | NTSC | US* |
| Chile | M | | NTSC | US |
| Dominican Republic | M | | NTSC | US |
| Commonwealth of Dominica | — | — | — | — |
| Trinidad and Tobago | M | | NTSC | US |
| Nicaragua | M | | NTSC | US |
| Haiti | M | | NTSC | US* |
| Panama | M | | NTSC | US |
| Bahamas | M | | NTSC | US* |
| Paraguay | N | | ? | US* |
| Barbados | M | | NTSC | US |
| Brazil | M | M | PAL | US |
| Venezuela | M | | NTSC | US |
| Peru | M | | NTSC | US |
| Bolivia | N | | PAL | US |
| Honduras | M | | NTSC | US |
| Mexico | M | M | NTSC | US |

*Presumed Channels

TABLE 9

List of Color TV Systems for Every Country in the Principal Parts of Europe

| Country | System | | | |
|---|---|---|---|---|
| | VHF | UHF | Color | Channel |
| Europe | | | | |
| Iceland | B | | PAL | C.C.I.R. |
| Ireland | A | I | PAL | IR |
| | I | | | |
| Albania | B | | PAL | IT* |
| Andorra | | | | |
| United Kingdom | A | I | PAL | UK |
| Italy | B | G | PAL | IT |
| Austria | B | G | PAL | C.C.I.R. |
| Netherlands | B | G | PAL | C.C.I.R. |
| Greece | B | G | SECAM | C.C.I.R. |
| San Marino | B | G | PAL | IT |
| Switzerland | B | G | PAL | C.C.I.R. |
| Sweden | B | G | PAL | C.C.I.R. |
| Spain | B | G | PAL | C.C.I.R. |
| C.I.S. (Formally U.S.S.R.) | D | K | SECAM | OIRT |
| Czecho Slovakia | D | K | SECAM | OIRT |
| Denmark | B | G | PAL | C.C.I.R. |

TABLE 9-continued

List of Color TV Systems for Every Country in the Principal Parts of Europe

| Country | System | | | |
|---|---|---|---|---|
| | VHF | UHF | Color | Channel |
| Federal Republic of Germany | B | G | PAL | C.C.I.R. |
| Norway | B | G | PAL | C.C.I.R. |
| Vatican City State | — | — | — | — |
| Hungary | D | K | SECAM | OIRT |
| Finland | B | G | PAL | C.C.I.R. |
| France | E L | L | SECAM | F |
| Bulgaria | D | K | SECAM | OIRT |
| Belgium | B | H | PAL | C.C.I.R. |
| Poland | D | K | SECAM | OIRT |
| Portugal | B | G | PAL | C.C.I.R.* |
| Malta | B | | PAL | C.C.I.R. |
| Principality of Monaco | G | L G | SECAM PAL | C.C.I.R. |
| Yugoslavia | B | G | PAL | C.C.I.R. |
| Liechtenstein | — | — | — | — |
| Grand Duchy of Luxemburg | C | L G | SECAM PAL | C.C.I.R.* |
| Rumania | D | D | | OIRT |

*presumed Channels in Great Britain, Germany, China, etc., NTSC (National Television System Committee) employed in Japan, United States, etc. and SECAM (Sequential Couleur a Memoire) employed in France, C.I.S. (the Commonwealth of Independent States; formally the Union of Soviet Socialist Republics (USSR)), etc.

On the other hand, detailed specifications of the representative channel broadcast systems (i.e. the color TV broadcast systems) in Tables 7 to 9 are described in Table 10. As shown in Table 10, representative channel broadcast systems include the commercial broadcast and the public broadcast systems of Great Britain (UKCH), the broadcast system based on C.C.I.R. (Comite Consultatif International des Radio Communications (C.C.I.R.C.H)), the broadcast system based on OIRT (Organization Internationale Radiodiffusion et de Television (OIRT CH)), the old public broadcast system of France (Old French CH), the present public broadcast system of France (French CH), the old commercial broadcast system of Luxemburg (Old Luxemburg CH), the present commercial broadcast system of Luxemburg (Luxemburg CH), the commercial and public broadcast systems in the United States (USCH), the commercial and public broadcast systems in Japan (Japan CH), the national broadcast system of Argentine (Argentina CH) and the public broadcast system of Ireland (Ireland CH).

Further, Table 10 shows the frequency range used for the standard broadcast system, the frequency range used for the

TABLE 10

Detailed List of Color TV Broadcast Systems

| Popular Name of Broadcasting Systems | UKCH (VHF) | C.C.I.R. CH (1) | C.C.I.R. CH (2) | Luxemburg CH (VHF) | OIRT CH (1) | OIRT CH (2) |
|---|---|---|---|---|---|---|
| Standard Broadcasting System | A | B | G.H | C | D | K, $K_1$ |
| Audio Modulation System | $A_3$ | $F_3$ (±50 kHz) | $F_3$ (±50 kHz) | $A_3$ | $F_3$ (±50 kHz) | $F_3$ (±50 kHz) |
| fs-fp Band Width | −3.5 MHz | +5.5 MHz | +5.5 MHz | +5.5 MHz | +6.5 MHz | +6.5 MHz |
| Channel Band Width | 5.0 MHz | 7.0 MHz | 8.0 MHz | 7.0 MHz | 8.0 MHz | 8.0 MHz |
| Number of Scanning Lines | 405 Poles | 625 Poles | 625 Poles | 625 Poles | 625 Poles | 625 Poles |
| Popular Name of Broadcasting Systems | Old French CH (VHF) | French CH | US or JAP CH | Argentina CH | Ireland CH | Old Luxemburg CH (VHF) |
| Standard Broadcasting System | E | L | M | N | I | F |
| Audio Modulation System | $A_3$ | $A_3$ | $F_3$ (±25 kHz) | $F_3$ (±25 kHz) | $F_3$ (±50 kHz) | $A_3$ |
| fs-fp Band Width | ±11.15 MHz | +6.5 MHz | +4.5 MHz | +4.5 MHz | +6 MHz | +5.5 MHz |
| Channel Band Width | 14.0 MHz | 8.0 MHz | 6.0 MHz | 6.0 MHz | 8.0 MHz | 7.0 MHz |
| Number of Scanning Lines | 819 Poles | 625 Poles | 525 Poles | 625 Poles | 625 Poles | 819 Poles |

Note:
UK VHF Channel is included in Ireland channel

In Tables 7 to 9, the standard frequency range used in the VHF and UHF areas are described in symbols A, B, C, . . . , L, M, etc. for every country. These symbols are indicated according to JCS (Japanese Cable Maker's Association Standard), and the frequency range becomes higher regarding A, B, C and so forth in that order.

Further, in Tables 7 to 9, the color output video systems and the channel broadcast systems for the color TV system are described in abbreviation or symbols for every country. Abbreviations for the representative color output video systems include PAL (Phase Alteration by Line) employed audio modulation system, the fs–fp band width between the audio frequency fs and the video frequency fp, the channel band width and the number of scanning lines for each channel system.

As is apparent from the list of receiving frequencies of the channels for every country shown in Tables 1 to 6, a multiplicity of channels exist for the tuner to receive in different countries. The central frequency, the frequency range, the video frequency fp, the audio frequency fs, the local oscillation frequency fosc and the image frequency, which can normally receive the radio waves are varied from one channel number to another of the receiving stations corresponding to each channel. The reason is that, as seen from the list of the color TV systems for every country shown in Tables 7 to 9 and the detailed list of the color TV broadcast systems shown in Table 10, different countries employ different color output video systems for the receiver (NTSC system for Japan and U.S., and PAL system for Great Britain, Germany and China, for example), different standard broadcast systems, different audio modulation systems, different channel band width, different video band width (fs–fp band width) and different numbers of scanning lines. As a result, the tuner specifications vary from one country to another, with the result that each country uses a different tuner specification.

As a first concrete example related to the conventional tuner receiving system, Japanese Unexamined Patent Publication (Kokai) No. 6-46427 (published on Feb. 18, 1994) discloses a global tuning control system which is capable of automatic tuning and automatic presetting by using the FS (Frequency Synthesizer) system. In a receiving system, such as a VTR (Video Tape Recorder), using the global tuning control system as described above, the tuning control unit sends out a command as digital data to the electronic tuner unit to receive the reference frequency of each TV channel, which has been stored in advance as data in a ROM (Read-Only Memory), in accordance with the destination and the like. After that, the electronic tuner unit receives the radio wave of the channel frequency based on the particular command.

Further, the tuning control unit monitors and recognizes the signal indicating the presence or absence of the video signal from the video signal processing unit and the tuning discrimination signal from the electronic tuner unit described above, so as to attain just automatic tuning. According to this configuration, however, the reference frequency of each TV channel is stored in the form of ROM data, for example, corresponding to the destination. In the case in which the VTR, etc. is moved from one country to another country, for example, from Japan to China, the ROM data in the two countries becomes different from each other. Therefore, it becomes impossible for the tuning control unit and the electronic tuner unit to meet the above inconvenience successfully. In view of the fact that the tuning control unit and the electronic tuner unit try to receive the radio wave of a channel frequency based on the ROM data according to the Japanese specifications, however, these units continue a detection operation of the channel frequency in the state that the radio wave cannot be received normally and therefore, cannot recognize the areas in which the above inconvenience cannot be solved by these units. As a measure against this inconvenience, it is absolutely necessary to prepare ROM data for every country in advance.

As a second concrete example relating to the conventional tuner receiving system, a configuration of a receiving system is disclosed in Japanese Unexamined Patent Publication No. 10-39970 (published on Feb. 13, 1998) and Japanese Unexamined Patent Publication No. 10-39971 (published on Feb. 13, 1998), in which the receiving unit including a tuner and an extension board can be separated from each other. This configuration can readily and rapidly deal with the difference of the broadcast type, the broadcast system and the like, by replacing the present receiving unit with the other one suitable for the broadcast type, such as the terrestrial broadcast, the satellite broadcast or satellite communication, or CATV.

This configuration, however, merely describes the receiving unit including the tuner and also a technique for receiving images sent out from the receiving unit by using the main body of a personal computer. In other words, the personal computer per se (usually indicating the main part of the personal computer) is incapable of discriminating the type of the receiving unit. The personal computer, though capable of controlling the tuner, cannot discriminate the type of the tuner in the case in which the user intends to use the tuner overseas. In the case in which the tuner is changed to receive an overseas broadcast, therefore, an input video reproduction application program and an input audio reproduction application program for controlling the tuner are required to be reinstalled in the personal computer.

With the conventional receiving system in which the TV video and audio signals are received by the personal computer by the use of the capture card built therein as in the second concrete example described above, the tuner built in the receiving unit cannot be recognized by the personal computer in the case in which it is used overseas in spite of the fact that the particular personal computer, the capture card and the receiving unit are configured to receive the overseas broadcast. Thus, the personal computer fails to recognize that the overseas channel number is different from the domestic channel number and a normal control operation becomes impossible. In the case in which the receiving system for domestic use is used overseas, therefore, the problem occurs in that the input video reproduction application program and the input audio reproduction application program for controlling the tuner must be reinstalled.

SUMMARY OF THE INVENTION

The present invention has been developed in view of the problems described above, and the object thereof is to provide a tuner receiving system, a control unit for receiving radio waves, a storage medium which can be read by using a computer, and a method for receiving radio waves by using a tuner, in which even when a tuner receiving system that has been used in a given country is used overseas in another country, the tuner can be controlled to receive the channel number that is broadcast overseas in another country, without reinstalling the input video reproduction application program or the input audio reproduction application program in the main part of the system, by recognizing the type of the tuner connected to the capture card built in the main part of the system, such as the personal computer.

In order to achieve the object described above, according to one aspect of the present invention, there is provided a tuner receiving system comprising a tuner unit for performing a tuning operation by receiving radio waves sent from an external source; a communication interface unit for performing communication with the tuner unit; and the main part of the system for processing the signals sent out from the communication interface unit and outputting predetermined data, wherein the main part of the system is configured to discriminate the type of the tuner included in the tuner unit, based on the control signal output from the tuner unit after the communication starts, and display the receiving station corresponding to a channel receivable by the tuner, in accordance with the type of the tuner and information from the communication interface unit.

Preferably, the tuner receiving system according to the present invention is configured so that, in the case in which the control signal is not output from the tuner unit before the lapse of a predetermined time from the start of the communication, the main part of the system determines and displays that no tuner is included in the tuner unit.

According to another aspect of the present invention, there is provided a control unit, for receiving radio waves, in which communication is established between a tuner unit for receiving the radio waves of a given channel from external sources so as to carry out a tuning operation and a communication interface unit connected to the tuner unit, and a signal sent out from the communication interface unit is processed, and predetermined data is output. This control unit comprises a unit for discriminating the type of the tuner communicating with the communication interface unit included in the tuner unit, based on a control signal output from the tuner unit after the start of the communication; and a unit for displaying a receiving station corresponding to the channel receivable by the tuner, in accordance with the type of the tuner and information from the communication interface unit.

Preferably, the control unit according to the present invention is adapted to determine and display that no tuner is included in the tuner unit, in the case in which no control signal is output from the tuner unit before the lapse of a predetermined time from the start of the communication.

According to still another aspect of the present invention, there is provided a storage medium which can be read by using a computer, for storing a program whereby a computer functions as a unit for discriminating the type of the tuner included in the tuner unit, based on a control signal output from the tuner unit after the start of the communication between the tuner unit and a communication interface unit connected to the tuner unit (the tuner unit carrying out a tuning operation by receiving the radio waves sent from external sources); and a unit for displaying a receiving station corresponding to a channel receivable by the tuner on a display unit, in accordance with the type of the tuner and information from the communication interface unit.

According to yet another aspect of the present invention, there is provided a method for receiving radio waves by using a computer, for establishing a communication between a tuner unit and a communication interface unit connected to the tuner unit, and for outputting predetermined data by processing a signal sent out from the communication interface unit. This method comprises the steps of discriminating the type of the tuner included in the tuner unit, based on a control signal output from the tuner unit from the start of the communication; and displaying a receiving station corresponding to a channel receivable by the tuner, in accordance with the type of the tuner and information from the communication interface unit.

In short, according to the present invention, after starting communication between a communication interface unit and a tuner unit by transmitting the address of a specific channel number to the tuner unit, the main part of the system determines whether or not the level of the control signal output from the tuner unit through the communication interface unit is normal, and in the case in which it is determined that the control signal level is normal, the type of the tuner included in the tuner unit can be discriminated. Further, all the channel numbers for the countries receivable by the type of tuner are indicated on the main part of the system. As a result, even in the case in which the tuner receiving system used in a given country is used in another country, the tuner can be controlled in a manner corresponding to the channel number which is broadcast in the particular other country, without reinstalling the application programs for input video reproduction and input audio reproduction in the main part of the system.

Furthermore, according to the present invention, in the case in which no control signal is output at all before the lapse of a predetermined time from the start of the communication between the communication interface unit and the tuner unit, it is determined that no tuner is built in the tuner unit, and the application programs in the main part of the system can be switched so that only the video signal and the audio signal may be input from the connector unit.

BRIEF DESCRIPTION OF THE DRAWINGS

The above object and features of the present invention will be more apparent from the following description of a basic embodiment and preferred embodiments with reference to the accompanying drawings, wherein.

DESCRIPTION OF THE PREFERRED EMBODIMENTS

The configuration and operation of the basic embodiment and the preferred embodiments of the present invention will be explained below with reference to the accompanying drawings of FIGS. 1 to 7.

Figure 1:
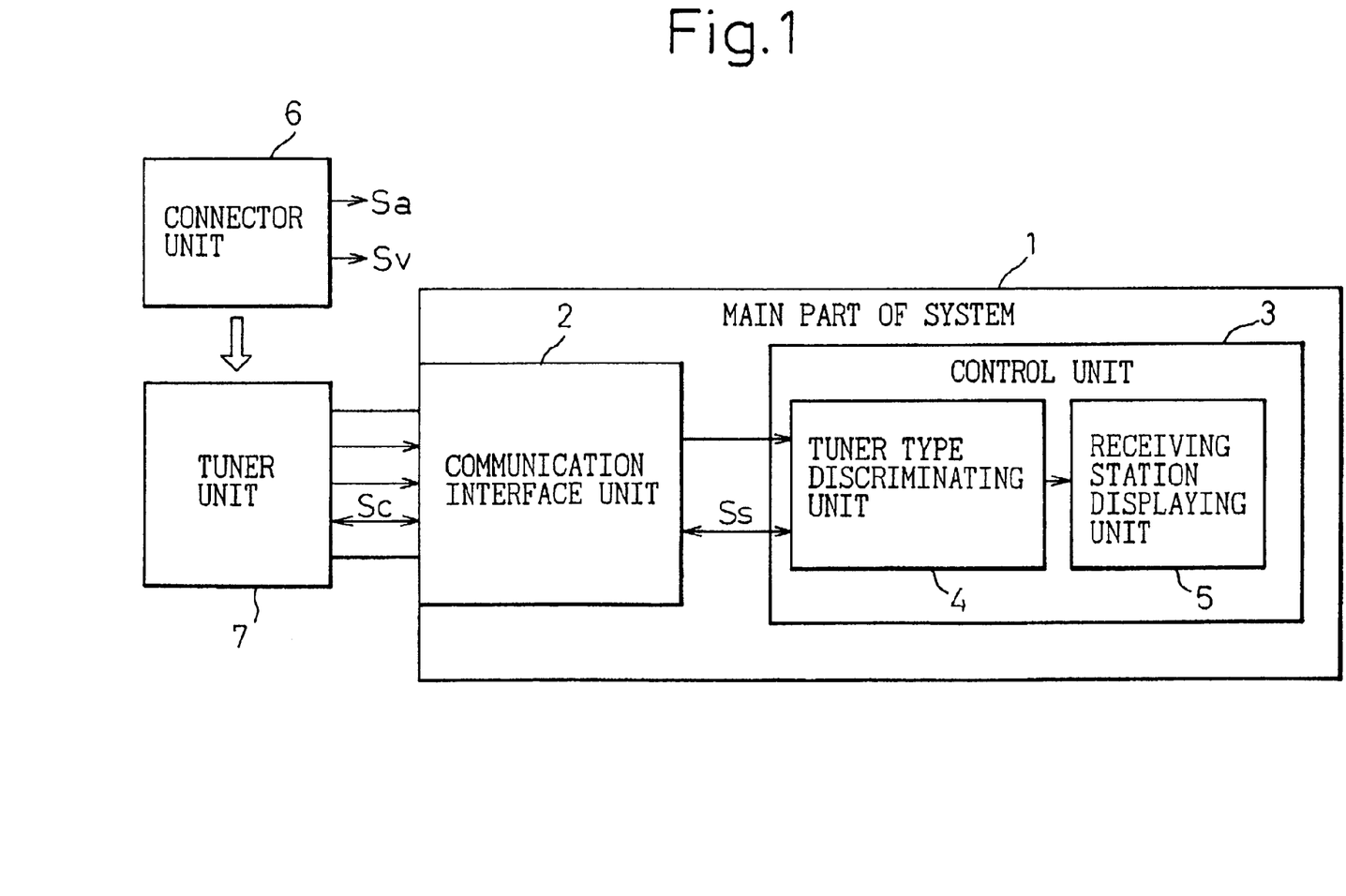
FIG. 1 is a block diagram showing a configuration of a basic embodiment based on the principle of the present invention.

FIG. 1 is a block diagram showing a configuration of the basic embodiment based on the principle of the invention. In this case, however, a simplified configuration of a tuner receiving system according to the basic embodiment is shown.

The tuner receiving system shown in FIG. 1 comprises a tuner unit 7 for performing a tuning operation by receiving radio waves of an arbitrary channel number sent from external sources, a communication interface unit 2 connected to the tuner unit 7, and the main part of the system 1 for processing the signal (such as a communication signal Ss) sent out of the communication interface unit 2 and outputting predetermined video or audio data. The serial communication interface unit 2 has the function of controlling a tuning operation of the tuner unit 7 by transmitting a specific address to the tuner unit 7 and thus establishing communication with the tuner 7. The communication interface unit 2 can be built in the main part of the system 1.

Further, the tuner receiving system comprises a connector unit 6 having the same size as the tuner (FIG. 2) included in the tuner unit 7. The connector unit 6 has a connector to be connected to the main part of the system 1, through which an external video signal Sv and an external audio signal Sa can be directly input to the communication interface unit 2.

Furthermore, in the tuner receiving system shown in FIG. 1, the main part of the system 1 is configured in such a manner that after starting the communication between the communication interface unit 2 and the tuner unit 7, the type of the tuner included in the tuner unit 7 is discriminated based on the control signal Sc output from the tuner unit 7, and in accordance with the type of the tuner and information from the communication interface unit 2, the receiving station (i.e. the channel number) corresponding to a channel receivable by the tuner is displayed.

Preferably, the main part of the system 1 determines and indicates that no tuner is included in the tuner unit 7, in the case in which the control signal Sc is not output from the tuner unit 7 before the lapse of a predetermined time from the start of the communication between the communication interface unit 2 and the tuner unit 7.

Further, preferably, the main part of the system 1 includes a control unit 3 for processing the communication signal Ss sent out from the communication interface unit 1 and outputting predetermined video and audio data. The control unit 3 includes a tuner type discriminating unit 4 which can be constituted by computer software and a receiving station display unit 5 (i.e. a display unit). The tuner type discriminating unit 4 has the function of discriminating the type of the tuner, based on the control signal Sc output from the tuner unit 7 after the communication starts between the communication interface unit 2 and the tuner unit 7. On the other hand, the receiving station display unit 5 has the function of displaying the receiving station corresponding to the channel receivable by the tuner, in accordance with the tuner type discriminated and the information from the communication interface unit 2.

Furthermore, there is provided a computer readable storage medium for storing a program whereby a personal computer or the like in the tuner receiving system functions as a unit for discriminating the type of the tuner included in a tuner unit for carrying out the tuning operation by receiving the radio waves sent from external sources, based on the control signal output from the tuner unit after the communication starts between the tuner unit and the communication interface unit connected to the tuner unit; and a unit for displaying on a display unit the receiving station corresponding to the channel receivable by the tuner, in accordance with the tuner type and the information from the communication interface unit.

On the other hand, there is provided a method of receiving radio waves by using the tuner receiving system or the like, so as to output predetermined video and audio data by receiving and processing radio waves sent from external sources, wherein the type of the tuner included in the tuner unit is discriminated based on the control signal output from the tuner unit after the communication starts between the communication interface unit and the tuner unit, and the receiving station corresponding to the channel receivable by the tuner is indicated in accordance with the type of the tuner and the information from the communication interface unit.

In summary, according to a basic embodiment of the present invention, after the communication starts between the communication interface unit and the tuner unit by transmitting the address of a specific channel number to the tuner unit, the main part of the system determines whether or not the level of the control signal output from the tuner unit through the communication interface unit is normal, and in the case in which it is determined that the control signal level is normal, the type of the tuner included in the tuner unit is identified. Further, all the channel numbers for the countries in which data can be received by the tuner are displayed on the main part of the system. Even in the case in which the tuner receiving system usually used in a given country is used in a different country, the tuner can be easily controlled in a manner corresponding to the channel number which is broadcast in the particular different country, without reinstalling the application programs for input video reproduction and input audio reproduction in the main part of the system.

In addition, according to a basic embodiment of the present invention, in the case in which the control signal is not output at all before the lapse of a predetermined time from the start of the communication between the communication interface unit and the tuner unit, it is determined that no tuner is built in the tuner unit, and the application programs on the main part of the system can be switched so that only the video and audio signals may be input from a connector unit.

Figure 2:
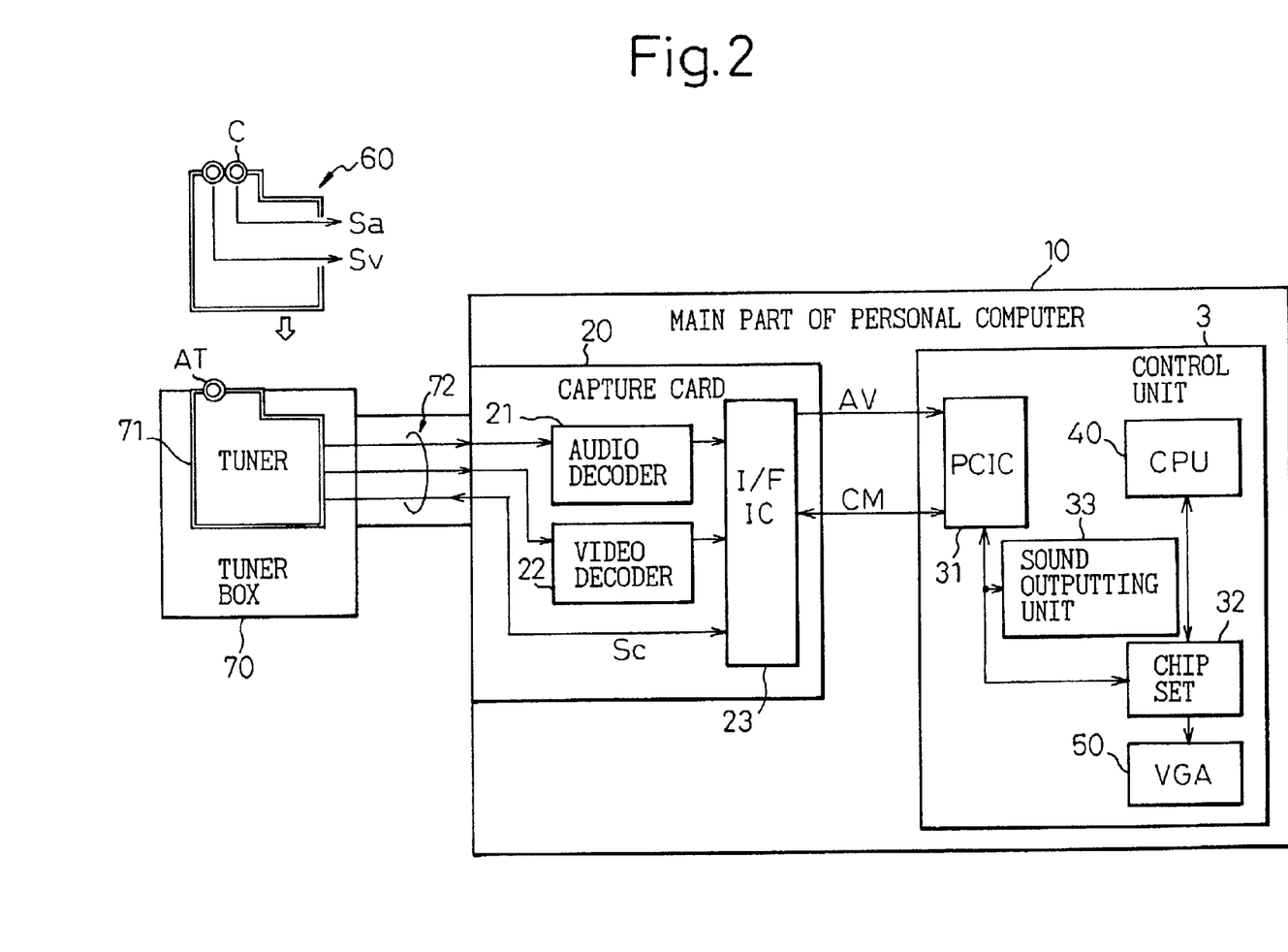
FIG. 2 is a block diagram schematically showing a configuration of a preferred embodiment of the present invention.

FIG. 2 is a block diagram schematically showing a configuration according to a preferred embodiment of the present invention. In the description that follows, the component elements similar to those described above will be designated by the same reference numerals, respectively.

As shown in FIG. 2, a tuner receiving system according to a preferred embodiment of the invention comprises a tuner box 70 functioning as a tuner unit (FIG. 1), a capture card 20 functioning as a communication interface unit (FIG. 1), and a personal computer 10 such as a notebook-sized personal computer functioning as the main part of the system 1 (FIG. 1).

The tuner box 70 includes an antenna terminal AT connected with an antenna and a tuner 71 built in the tuner box. The tuner box 70 receives radio waves of an arbitrary channel number sent from external sources through the antenna AT and performs a tuning operation by setting the frequency corresponding to the channel number through the tuner 71.

Further, the tuner receiving system according to the embodiment shown in FIG. 2 includes a connector unit 60 functioning as a connector (FIG. 1). The connector unit 60 includes a connector C of the same size as the tuner 71 and having a pin jack and a minijack. The analog video signal Sv and the analog audio signal Sa from external sources can be directly input to the capture card 20 through the connector C.

In other words, various replaceable tuners 71 and connector units 60 can be built in the tuner box 70. The tuner has an antenna for receiving radio waves sent from television broadcasting stations and outputting analog video and audio signals. The connector unit of the same size as the tuner, on the other hand, is supplied with an analog video signal from the pin jack of the connector and an analog audio signal from the minijack of the connector. The control unit 3 in the main part of the personal computer, once it recognizes the type of the tuner, determines the country for the tuner. As a result, the requirement for the particular tuner can be met without resorting to the application programs (operating system) for the input video reproduction and the input audio reproduction of the personal computer. The tuner in the tuner box is of socket type and can be replaced without changing the tuner housing for each country, which leads to a cost reduction. In this case, however, the values of the central frequency of the channel number for each country are required to be registered in advance in the storage unit such as the ROM of the personal computer.

The capture card 20 in the embodiment of FIG. 2 is connected to the tuner box 70 through a connecting cable 72 and preferably built in the personal computer 10. The capture card 20 controls the tuning operation of the tuner 71 by communication (serial communication, for example) with the tuner 71 by transmitting a specific address to the tuner 71. On the other hand, the capture card 20 receives the analog video signal Sv and the analog audio signal Sa sent through the tuner 71 from external sources, and sends them to the personal computer 10 after converting them into digital signals. In the case in which the tuner 71 is not built in the tuner box 70, however, the analog video signal Sv and the analog audio signal Sa output from the connector unit 60 are received and, after being converted into digital signals, are sent to the personal computer 10.

More specifically, the capture card 20 includes an audio decoder 21 for decoding the audio signal Sa, a video decoder 22 for decoding the video signal Sv, and an interface IC (integrated circuit) 23 functioning as an interface between the tuner 71 and the control unit 3 (the interface IC is abbreviated to I/F IC in FIG. 2).

The video signal Sv and the audio signal Sa input to the capture card 20 are decoded by the audio decoder 21 and the video decoder 22, and output from the interface IC 23 as an audio/video data (AV data) AV containing digital audio and video data. On the other hand, the control signal (serial control signal, for example) Sc output from the tuner 71, after the communication starts between the tuner 71 and the system control unit 3, is output from the interface IC 23 as communication data CM (corresponding to the communication signal Ss such as the serial communication signal of FIG. 1) required for executing the aforementioned communication.

The tuner type discriminating unit 4 (FIG. 1) in the control unit 3 of the personal computer 10 is implemented by the CPU (Central Processing Unit) 40 of the personal computer such as the notebook-sized personal computer. Further, the receiving station display unit 5 (FIG. 1) constituting the display unit in the control unit is implemented by the CPU 40 and a video graphics array (VGA) 50 including a graphics LSI for indicating the receiving station.

In addition, the control unit 3 includes a chip set 32 having a PCI (Peripheral Component Interconnect) bus and a north bridge and south bridge used in the personal computer 10, an audio output unit 33 for outputting the sound in accordance with the input audio/video data AV, and a PCI bus controller (PCIC) 31 for controlling the chip set 32 and the audio output unit 33.

The digital audio/video data AV and the digital communication data CM input from the interface IC 23 to the PCI bus controller 31 in the capture card 20 is supplied to the chip set 32 through the PCI bus controller 31. This chip set 32 has the function of controlling the exchange of various data between a main memory (not shown) in the CPU 31 and the storage units such as the RAM (Random Access Memory) and the ROM built in the personal computer 10 and the display control unit such as the video graphics array, and normally includes a plurality of LSI (Large Scale Integrated Circuit) chips.

Figure 3:
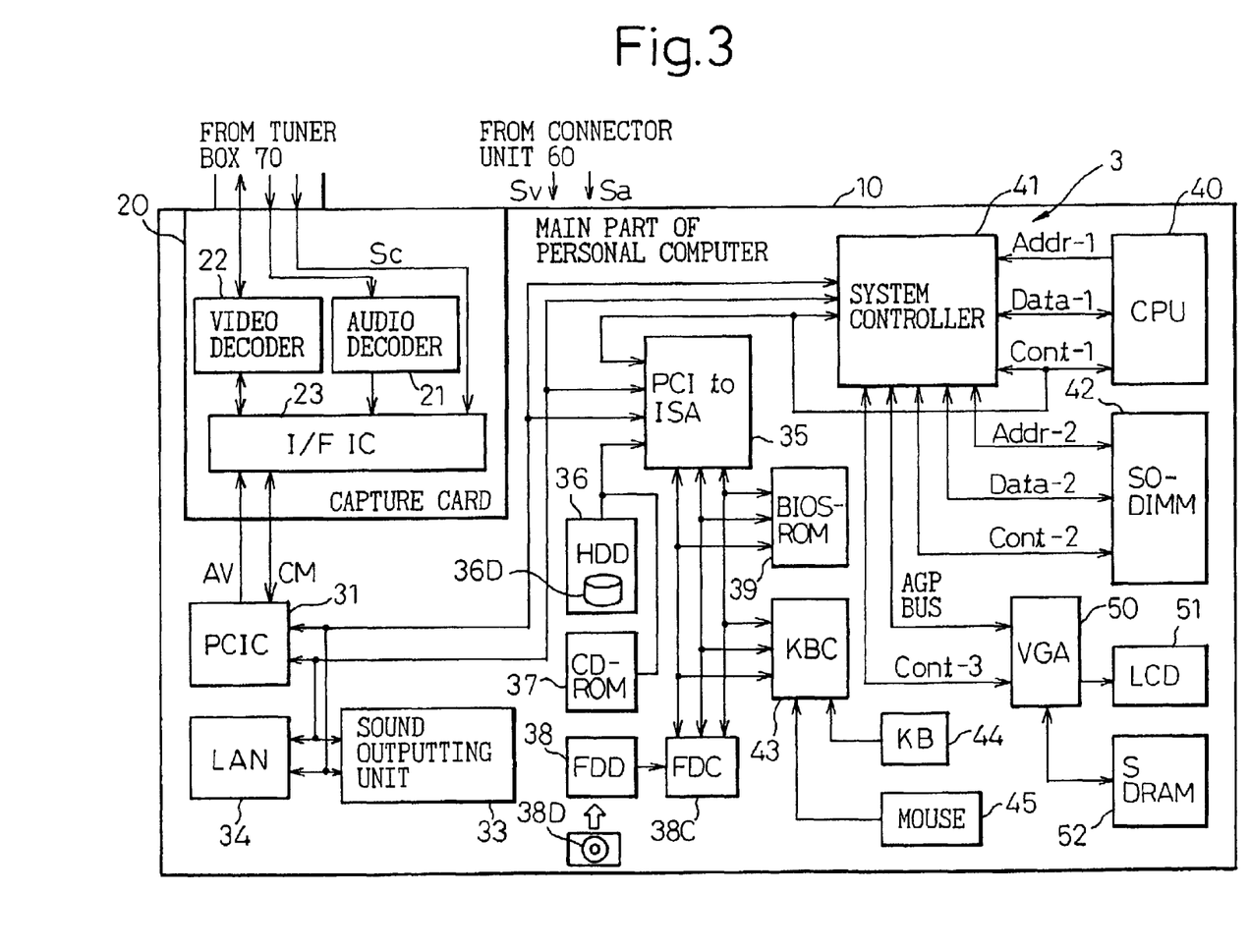
FIG. 3 is a block diagram showing a detailed configuration of the essential parts of the embodiment of FIG. 2.

FIG. 3 is a block diagram showing a detailed configuration of the essential parts according to the embodiment of FIG. 2. A detailed configuration of the control unit 3 constituting the feature of the present invention is shown.

In the control unit 3 shown in FIG. 3, the PCI bus controller 31 is connected to a local area network (LAN) 34 and an audio output unit 33. This local area network 34 controls the audio output unit 33 in such a manner as to output the sound in accordance with the audio/video data AV input to the PCI bus controller 31.

On the other hand, the PCI bus controller 31 is connected to a system controller 41 for controlling the whole personal computer and also connected to a PCI bus 35 conforming to the ISA (Industry Standard Architecture) standard constituting the essential parts of the chip set 32 (FIG. 2).

The system controller 41 has the function of controlling the exchange of various data (such as first data Data-1 and second data Data-2) and addresses (such as a first address Addr-1 and a second address Addr-2) between the main memory in the CPU 40 and the RAM (not shown) built in the personal computer and a small outline dual in-line memory module (SO-DIMM) 42 having an addition memory chip mounted thereon. The read/write operation of the main memory in the CPU 40 is controlled based on a first control signal Cont-1, while the read/write operation of the small outline dual inline memory module 42 is controlled based on a second control signal Cont-2.

The system controller 41 is also connected to the video graphics array 50 through an AGP (accelerated graphics port) bus connecting the main memory in the CPU and the graphics LSI. The read/write operation of the graphics LSI in the video graphics array 50 is controlled based on a third control signal Cont-3. The video graphics array 50 includes a liquid crystal display (LCD) unit 51 and a synchronous dynamic RAM (SDRAM) 52. More specifically, the video data output from the video graphics array 50 and the receiving station for each country are displayed on the liquid crystal display unit 51. Further, in order to realize the display of the video data with comparative rapidity, a synchronous dynamic RAM 52 is included.

Further, the PCI bus 35 of the ISA standard is connected to a floppy disk controller (FDC) 38C for controlling a floppy disk drive (FDD) 38, a keyboard controller (KBC) 43 for controlling input devices such as a keyboard (KB) 44 and a mouse 45, and a basic I/O system ROM (BIOS-ROM) 39 for controlling terminals and a printer (neither of them is shown) and input/output devices such as the hard disk drive described later. The floppy disk 38C is formed with a slot (not shown) for inserting the floppy disk 38D constituting a kind of auxiliary or external storage medium.

Furthermore, the PCI bus 35 of the ISA standard is provided with a hard disk drive (HDD) 36 having built therein a hard disk 36D constituting a kind of auxiliary or external storage medium and a CD-ROM (compact disk ROM) 37 having registered therein the data (Tables 1 to 6) on the receiving frequencies (central frequency, for example) of the channel number for each country.

In operating the tuner receiving system according to an embodiment of the present invention by using a storage medium such as a computer readable RAM, ROM or floppy disk, it is desirable to prepare a storage medium for storing a program whereby the computer functions as a unit (a tuner type discriminating unit, for example) for discriminating the type of the tuner included in a tuner box for performing the tuning operation by receiving arbitrary radio waves sent from external sources, based on the control signal output from the tuner box after starting the communication with the capture card connected to the tuner box; and a unit (a receiving station display unit, for example) for displaying the receiving station corresponding to the channel receivable by the tuner on the display unit, in accordance with the tuner type and the information from the capture card.

Figure 4:
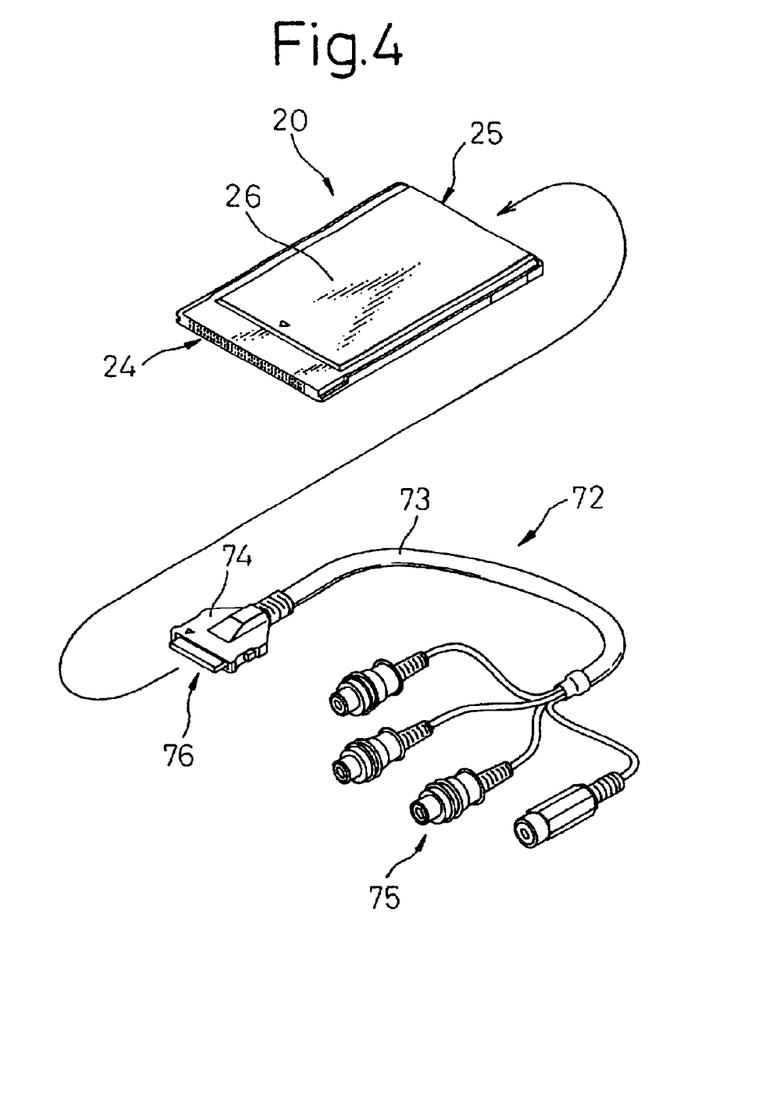
FIG. 4 is a perspective view showing an example of a configuration of a capture card and a connecting cable used in an embodiment of the present invention.

FIG. 4 is a perspective view showing an example configuration of the capture card and the connecting cable used in the embodiment of the present invention.

A label 26 is attached to the surface of the capture card 20 shown in FIG. 4. A PC card (personal computer memory card) connector 24 and a back connector 25 are arranged at each end of the capture card 20. The PC card connector 24 is for connecting the capture card to the PC card slot formed in the main part of the personal computer 10. The back connector 25 is for connecting the capture card 20 to the connecting cable 72 and the tuner box 70.

A 15-pin connector 76 and a cable-side plug 74 are arranged at an end of the cable body 73 of the connecting cable 72. Through the 15-pin connector 76 and the cable-side plug 74, the capture card 20 can be connected to the connecting cable 72. Further, a video input terminal, an audio input terminal, a power terminal and the like signal input terminals 75 are arranged at the other end of the cable body 73 of the connecting cable 72. The analog video signal Sv, the analog audio signal Sa and the control signal Sc sent out from the tuner box 70 (FIG. 2) are input to the signal input terminal 75, and through the cable body 73, the cable-side plug 74 and the 15-pin connector 76, transferred to the capture card 20.

Figure 5:
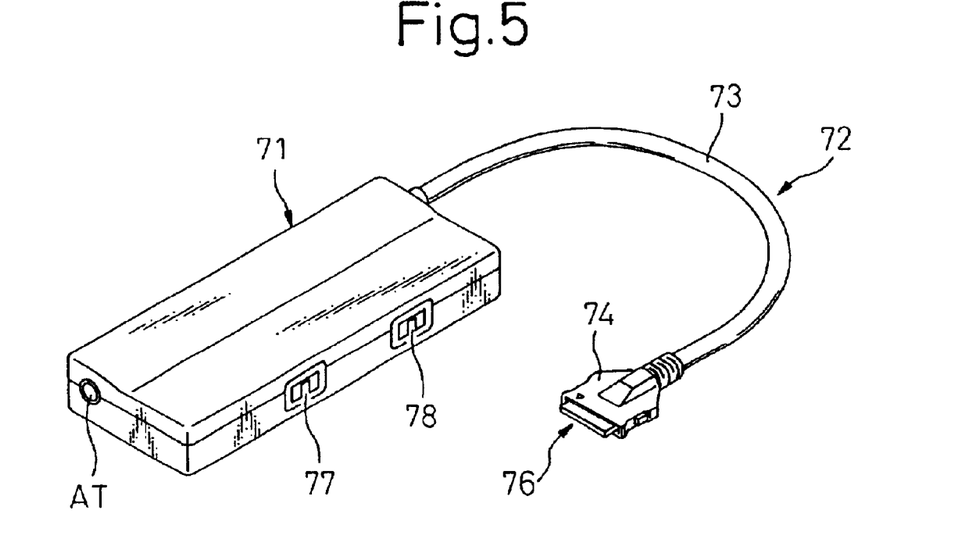
FIG. 5 is a perspective view showing an example of a configuration of a tuner used in the embodiment of the present invention.

FIG. 5 is a perspective view showing an example configuration of the tuner used in the embodiment of the present invention. The tuner 71 built in the tuner box 70 (FIG. 2) and the connecting cable 72 are connected to each other as shown. The tuner 71 shown in FIG. 5 receives the radio wave for TV broadcast or the CATV signal through the antenna terminal AT connected to an indoor antenna or an outdoor antenna. Further, the tuner 71 performs the tuning operation under the control of the system control unit 3 (FIG. 2) in the main part of the personal computer, so that the radio wave for TV broadcast and the CATV signal are converted into the analog video signal Sv and the analog audio signal Sa and output to the capture card 20 (FIG. 2).

Furthermore, the tuner 71 includes a mode switch 77 for switching the channel number receiving mode, and an audio mode switch 78 for switching the audio output of an audio multiplex broadcast. The mode switch 77 typically switches the auto preset mode for automatically registering the standard channel number, the manual preset mode for adding or deleting the channel number and the search mode for searching a plurality of channel numbers, in that order. The audio switch 78 typically switches MAIN for outputting only the main sound, SUB for outputting only the auxiliary sound and MAIN/SUB for outputting both the main sound and the auxiliary sound.

Figure 6:
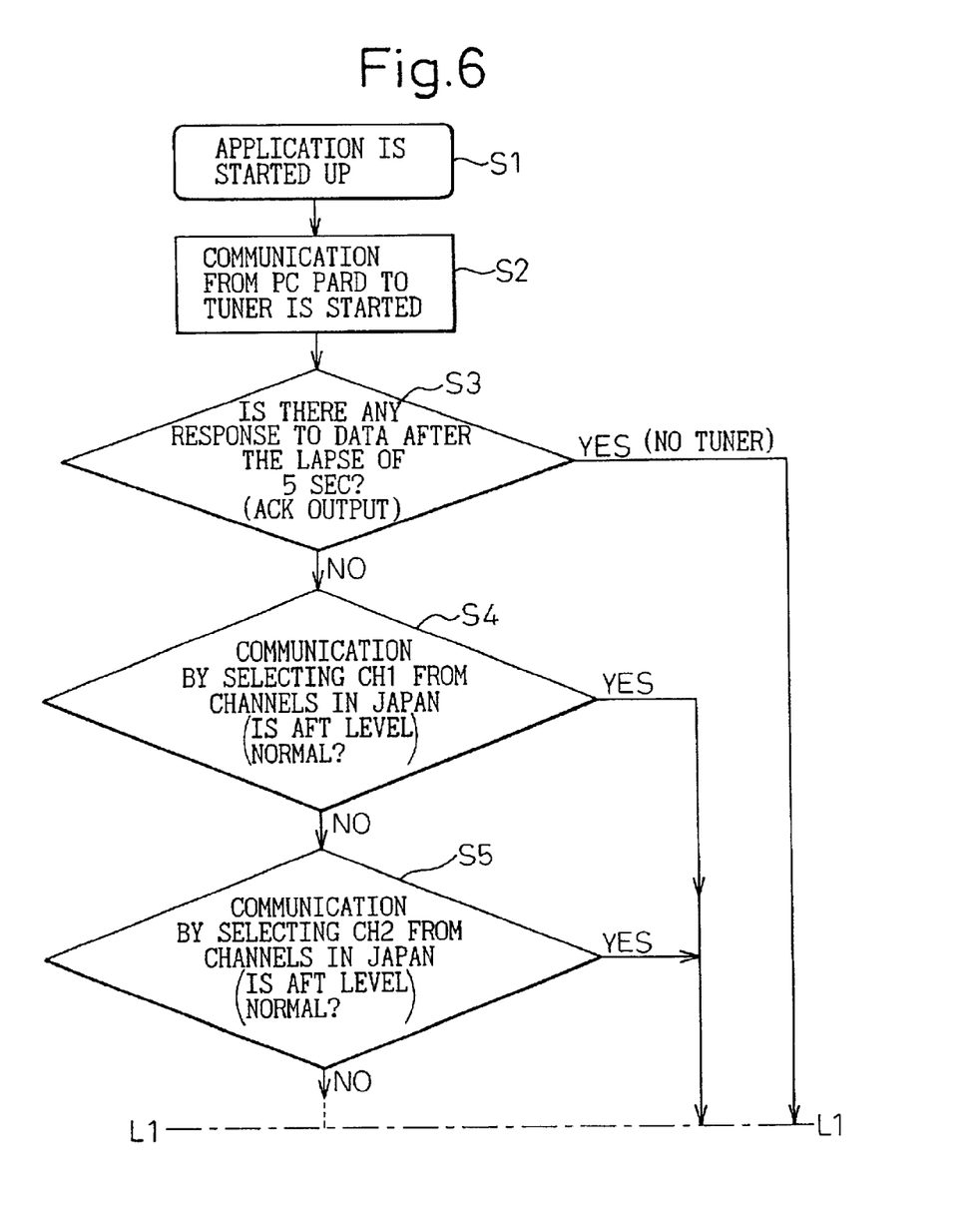
FIG. 6 is a first part of a flowchart for explaining the processing flow of a tuner receiving operation according to the present invention.
Figure 7:
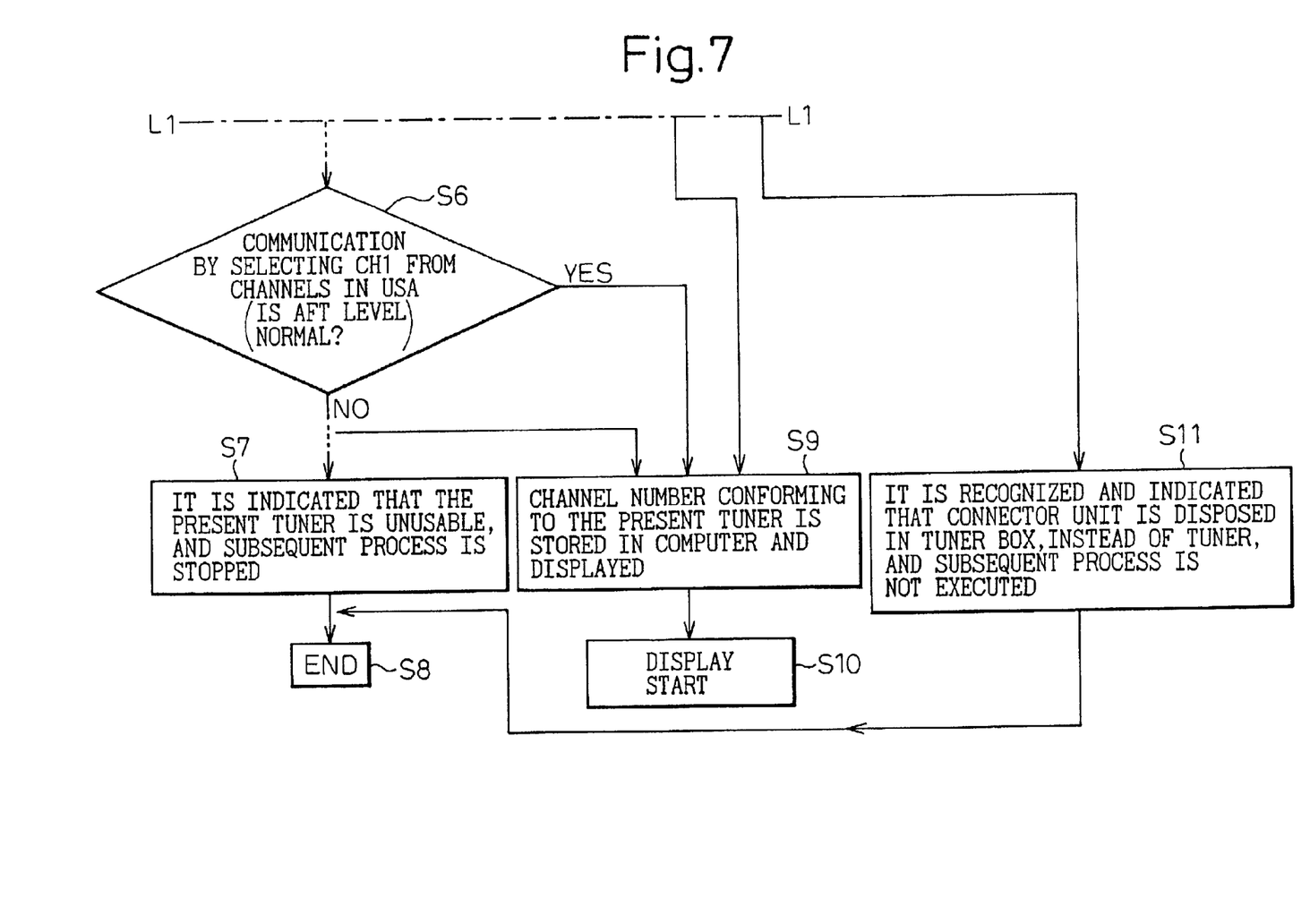
FIG. 7 is a second part of a flowchart for explaining the processing flow of a tuner receiving operation according to the present invention.

FIGS. 6 and 7 are a first part and a second part of a flowchart, respectively, for explaining the flow of the process for receiving signals through the tuner according to the present invention. In the case under consideration, however, an explanation will be given of the processing flow for receiving and processing the radio waves from external sources by using the tuner receiving system according to the embodiment shown in FIGS. 2 and 3.

As shown in the flowchart of FIG. 6, the main part of the personal computer in the tuner receiving system starts the application programs for input video reproduction and input audio reproduction in the control unit (step S1). Once the application programs are started, the capture card built in the slot of the PC card of the main part of the personal computer starts communication with the tuner and responds to the tuner (step S2). Further, the capture card transmits a specific address to the tuner and checks whether or not an acknowledge signal ACK (a kind of the control signal Sc shown in FIGS. 1 to 3) indicating the receipt of the address has been output from the tuner (step S3).

In the case in which no signal is output from the tuner before the lapse of a predetermined time length (e.g. 5 seconds) following the start of communication (i.e. in the case in which no data is output as a response within a predetermined time length), the application programs in the main part of the personal computer determine that no tuner is included. The application programs then recognize and indicate that the connector unit but not the tuner is built in the tuner box, thus ending the process, as shown in step S11 of FIG. 7 (step S8 in FIG. 7).

Returning to step S3 in FIG. 6, it is assumed that the acknowledge signal ACK has been output within five seconds after starting the communication. The application programs in the main part of the personal computer set the receiving frequency (central frequency, for example) corresponding to the channel number for each country. Further, the channel numbers of the television broadcasting stations in a given country are set sequentially, and it is determined whether or not the level of the AFT (auto frequency tuning) signal constituting a kind of the control signal returned from the tuner is normal. In the case in which it is determined that the AFT signal level is normal, the capture card recognizes that a receivable channel number exists and calls the receiving frequency of the television broadcasting station corresponding to the particular channel number.

After that, the tuning frequency corresponding to each channel number is set by the tuner and in the case in which it is recognized that the particular channel number is normally indicated by the level of the AFT signal output from the tuner, the particular channel number is stored in the personal computer. The channel number thus stored is assumed to be a receivable channel number. In this way, the main part of the personal computer and the capture card can discriminate the type of the tuner connected.

As shown in steps S4 and S5 of FIG. 6, for example, the receiving frequencies (central frequency, for example) corresponding to the channel numbers CH1, CH2, and so on (Table 1) of the television broadcasting stations in Japan are sequentially set for establishing the communication, and it is determined whether or not the AFT signal level is normal. In the case in which a given channel number is set and it is determined that the level of the AFT signal returned from the tuner is normal, as shown in step S9 of FIG. 7, the channel number in Japan conforming with the tuner is stored and displayed in the personal computer.

In the case in which it is not determined that the AFT signal level is normal for any of the channel numbers of the television broadcasting stations in Japan, on the other hand, as shown in step S6 of FIG. 7, the receiving frequencies corresponding to the channel numbers CH1, CH2, and so on (Tables 2 and 3) of the television broadcasting stations in the United States are set sequentially, followed by performing the process similar to steps S4 and S5 described above. In the case in which a given channel number is set and it is determined that the AFT signal level is normal, as shown by step S9 described above, the channel number of the United States conforming with the tuner is stored and displayed in the personal computer.

In the case in which it is not determined that the AFT signal level is normal for any of the channel numbers of the television broadcasting stations in United States, on the other hand, the next step is to sequentially set the receiving frequencies corresponding to the channel numbers for each country other than Japan and United States (Tables 4 to 6), and to perform the process similar to steps S4 and S5 described above. In the case in which a given channel number is set and it is determined that the AFT signal level is normal, as shown by step S9 described above, the channel number of a country conforming with the tuner is stored and displayed in the personal computer. Further, the application for input video reproduction and input audio reproduction starts the indication of all the channel numbers used in the particular country (step S10 in FIG. 7).

In the case in which it is determined that the AFT signal level is not normal for any channel number of the television broadcasting stations in all countries registered in the personal computer, on the other hand, it is indicated that the tuner is unusable and the subsequent process is stopped, thereby ending the process (Steps S7 and S8 in FIG. 7). In the case in which the tuner itself is lacking, the fact can be indicated easily by assuring that there exists no tuner due to the time-out of the communication.

As described above, according to typical embodiments of the present invention, in the case in which it is determined that the level of the signal output from the tuner unit is normal after starting the communication between the communication interface unit and the tuner unit, the type of the tuner included in the tuner unit is discriminated, and the channel number for the country conforming with this tuner is displayed. Even in the case in which the tuner receiving system that has thus far been used in a given country is used in a different country, therefore, the tuner can be easily controlled to meet the requirement for the channel numbers broadcast in that particular different country, without reinstalling the application programs in the main part of the system.

Further, according to typical embodiments of the present invention, in the case in which no signal is output at all from the tuner unit before the lapse of a predetermined time from the start of the communication between the communication interface unit and the tuner unit, it is determined that the connector unit having the same size as the tuner, but not the tuner, is built in the tuner unit, and corresponding application programs are provided. In this way, a system can be implemented which is capable of switching the video/audio units by the user simply by inputting the video signal or the audio signal.

What is claimed is:

1. A tuner receiving system, comprising:
   a tuner unit performing a tuning operation by receiving radio waves sent from external sources;
   a communication interface unit, connected to said tuner unit, performing a communication with said tuner unit;
   a main part of the system, processing a signal sent out from said communication interface unit and outputting predetermined data, being configured to discriminate a type of tuner included in said tuner unit, based on a first control signal indicating receipt of a specific address output from said tuner unit within a predetermined time after said communication between the tuner unit and said communication interface unit has started and the specific address has been transmitted from the communication interface unit to the tuner unit, the receiving frequencies corresponding to channels receivable by said tuner, in accordance with the type of said tuner and information from said communication interface unit, being sequentially set for establishing the communication; and
   when it is determined that the level of a second control signal returned from the tuner is normal, the type of the tuner is discriminated on the basis of the second control signal and all receiving stations, corresponding to channels receivable by the tuner, are displayed in accordance with the type of the tuner thus discriminated and information sent from the communication interface unit.

2. A tuner receiving system according to claim 1, wherein:
   said main part of the system determines and displays that no tuner is included in said tuner unit, in the case in which said control signal is not output from said tuner unit before the lapse of the predetermined time from the start of said communication.

3. A control unit receiving radio waves by using a tuner included in a tuner unit and in which communication is established between said tuner unit, receiving said radio waves of a given channel sent from external sources so as to carry out a tuning operation, and a communication interface unit, connected to said tuner unit, and a signal sent out from said communication interface unit is processed and predetermined data is output, said control unit comprising:
   a unit sequentially setting the receiving frequencies, corresponding to the channels receivable by the tuner, in the case in which a first control signal indicating the receipt of a specific address is output from the tuner within a predetermined time after a communication between the tuner unit and a communication interface unit has started and the specific address has been transmitted from the communication interface unit to the tuner unit;
   a unit discriminating the type of said tuner included in said tuner unit, based on a control signal output from said tuner unit within a predetermined time after the start of said communication; and
   a unit displaying all receiving stations corresponding to the channels receivable by said tuner, in accordance with the type of said tuner thus discriminated and information from said communication interface unit.

4. A control unit according to claim 3, further comprising a unit determining and displaying that no tuner is included in said tuner unit, in the case in which the control signal is not output from the tuner unit before the lapse of a predetermined time from the start of said communication.

5. A storage medium readable by a computer, storing a program controlling the computer to establish communication between a tuner unit, having a tuner receiving radio waves of a given channel sent from external sources so as to carry out a turning operation, and a communication interface unit connected to said tuner unit, to process a signal sent out from said communication interface unit and to output predetermined data, by:
   sequentially setting the receiving frequencies, corresponding to the channels receivable by the tuner, in the case in which a first control signal indicating the receipt of a specific address is output from the tuner within a predetermined time after a communication between the tuner unit and a communication interface unit has started and the specific address has been transmitted from the communication interface unit to the tuner unit;
   discriminating the type of the tuner included in the tuner unit, based on a control signal output from said tuner unit after a start of a communication between said tuner unit and the communication interface unit; and
   displaying all receiving stations corresponding to the channels receivable by said tuner, in accordance with the discriminated type of said tuner and information from said communication interface unit.

6. A method of receiving radio waves by using a tuner, included in a tuner unit, to establish communication between a tuner unit receiving said radio waves of a given channel sent from external sources so as to carry out a tuning operation, and a communication interface unit connected to said tuner unit, to process a signal sent out from said communication interface unit and to output predetermined data, said method comprising:

sequentially setting the receiving frequencies, corresponding to the channels receivable by the tuner, in the case in which a first control signal indicating the receipt of a specific address is output from the tuner within a predetermined time after a communication between the tuner unit and a communication interface unit has started and the specific address has been transmitted from the communication interface unit to the tuner unit;

discriminating the type of the tuner included in said tuner unit, based on a control signal output from said tuner unit within a predetermined time after the start of said communication; and displaying all receiving stations corresponding to the channels receivable by said tuner, in accordance with the discriminated type of said tuner and information from said communication interface unit.

* * * * *